United States Patent
DeGowske et al.

(10) Patent No.: US 9,945,702 B2
(45) Date of Patent: Apr. 17, 2018

(54) RECONFIGURABLE INDICATING DEVICE

(71) Applicants: DENSO International America, Inc., Southfield, MI (US); DENSO CORPORATION, Kariya, Aichi-pref. (JP)

(72) Inventors: Jill DeGowske, Waterford, MI (US); Ke Bi, Clawson, MI (US)

(73) Assignees: DENSO International America, Inc., Southfield, MI (US); DENSO CORPORATION, Kariya-city (JP)

( * ) Notice: Subject to any disclaimer, the term of this patent is extended or adjusted under 35 U.S.C. 154(b) by 150 days.

(21) Appl. No.: 15/051,969

(22) Filed: Feb. 24, 2016

(65) Prior Publication Data
US 2017/0241814 A1 Aug. 24, 2017

(51) Int. Cl.
*G01D 13/22* (2006.01)
*G06F 3/0482* (2013.01)
*G01D 13/12* (2006.01)

(52) U.S. Cl.
CPC ............. *G01D 13/22* (2013.01); *G01D 13/12* (2013.01); *G06F 3/0482* (2013.01)

(58) Field of Classification Search
CPC ....... G01D 13/22; G01D 13/12; G06F 3/0482
USPC .. 116/284–288, 305, 328, 332, 334, DIG. 6, 116/DIG. 36, 289, 306, 309; 362/26–30, 362/85
See application file for complete search history.

(56) References Cited

U.S. PATENT DOCUMENTS

| | | | | |
|---|---|---|---|---|
| 6,382,127 | B2 * | 5/2002 | Wehner | B60K 37/02 116/284 |
| 6,522,381 | B1 * | 2/2003 | Brandt | G01C 21/265 116/62.1 |
| 6,714,126 | B2 * | 3/2004 | Wada | B60K 37/02 116/286 |
| 7,193,729 | B1 * | 3/2007 | Li | G01D 13/22 340/461 |
| 7,263,870 | B2 * | 9/2007 | Avitia | G01D 3/022 250/231.11 |
| 7,791,015 | B2 * | 9/2010 | Chen | H01L 31/0203 250/221 |
| 8,151,725 | B2 * | 4/2012 | Masuda | G01D 11/28 116/204 |
| 8,225,736 | B2 * | 7/2012 | Cook | G01D 11/28 116/286 |
| 8,356,570 | B2 * | 1/2013 | Masuda | G01D 13/22 116/204 |
| 8,438,916 | B2 * | 5/2013 | Katoh | B60K 37/02 73/115.01 |
| 8,935,989 | B2 * | 1/2015 | Cook | G01D 11/28 116/286 |
| 2010/0038519 | A1 * | 2/2010 | Lin | H01L 25/042 250/208.1 |
| 2012/0247385 | A1 * | 10/2012 | Cook | G01D 11/28 116/286 |

(Continued)

*Primary Examiner* — R. A. Smith
*Assistant Examiner* — Tania Courson

(57) ABSTRACT

A pointer is rotational relative to a screen. A driver unit is equipped with the pointer and configured to rotate the pointer. A controller sends an output signal to the driver unit to rotate the pointer at a rotational position in a rotational range. The controller is configured to modify the rotational range. The controller is configured to modify the graphic according to the rotational range, which is modified.

13 Claims, 17 Drawing Sheets

(56) References Cited

U.S. PATENT DOCUMENTS

2013/0258635 A1\* 10/2013 Kato .................. G01D 13/22
                                                    362/23.02
2016/0245675 A1\* 8/2016 Hamalainen ......... G01D 13/265

\* cited by examiner

RECONFIGURABLE INDICATING DEVICE

TECHNICAL FIELD

The present disclosure relates to a reconfigurable indicating device.

BACKGROUND

Conventionally, an indicating device such as a meter device may include a pointer movable to point in a dial gauge to indicate information such as a residual fuel level of a vehicle. A meter device may desirably have a configurable rotational range of a pointer.

SUMMARY

According to an aspect of the preset disclosure, an indicating device comprises a screen configured to indicate a graphic, a pointer rotational relative to the screen, a driver unit equipped with the pointer and configured to rotate the pointer, and a controller configured to send an output signal to the driver unit to rotate the pointer at a rotational position in a rotational range. The controller is configured to modify the rotational range. The controller is configured to modify the graphic according to the rotational range, which is modified.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, an indicating device (meter device) 1 will be described with reference to drawings. In drawing(s), "VERTICAL" may correspond to a vertical direction. "AXIAL" may correspond to an axial direction. "RADIAL" may correspond to a radial direction. "HORIZONTAL" may correspond to a horizontal direction. "CIRCUMFERENTIAL" may correspond to a circumferential direction.

Figure 1:
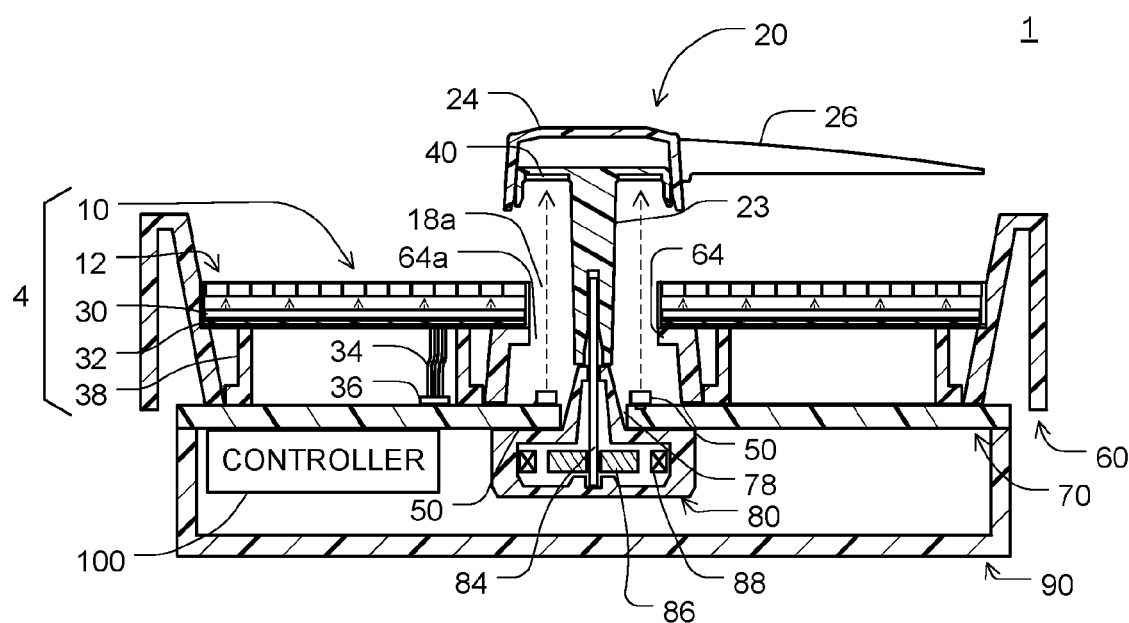
FIG. 1 is a sectional view showing an indicating device of a first embodiment.
Figure 1:
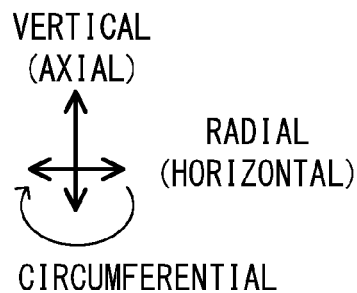

In FIG. 1, the meter device 1 may include a pointer 20, a screen 10, a lighting device 30, an image sensing device 50, a main housing 60, a printed circuit board (PCB) 70, a driver unit 80, and a rear housing 90.

The screen 10 is, for example, an LCD display or an organic EL display having a full-color dot-matrix configuration including multiple pixels 12, which are selectively activated. More specifically, the screen 10 may be an active matrix display such as a TFT LCD display. The screen 10 may be fortified by a translucent substrate formed of a translucent material such as glass. The screen 10 may have a display surface facing a viewer such as an occupant of an automobile.

Figure 7:
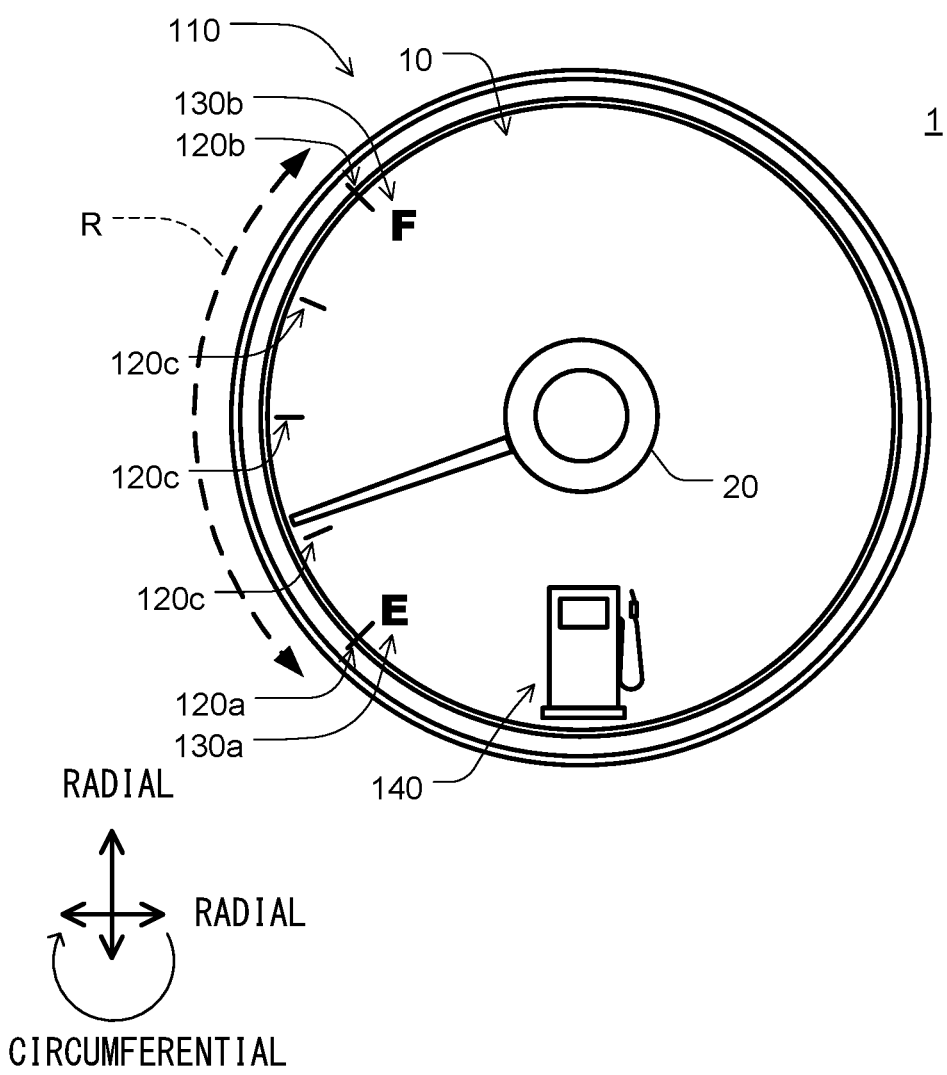
FIG. 7 is a front view showing the indicating device before the reconfiguration process.

As shown in FIG. 7, the meter device 1 is, for example, a fuel gauge for an automobile. The screen 10 may be in a circular shape when viewed from the viewer. The screen 10 may be configured to indicate various graphics such as a dial gauge 110 including a minimum tick mark 120*a*, a maximum tick mark 120*b*, intermediate tick marks 120*c*, a minimum symbol 130*a*, and a maximum symbol 130*b* to function as a gauge meter. The minimum symbol 130*a* may denote "E", which represents an empty state. The maximum symbol 130*b* may denote "F", which represents a full state.

The screen 10 may further indicate an indicated item 140, which represents an indicated symbol. In this example, the screen 10 indicates a residual fuel level and therefore, the indicated item 140 represents a gas pump.

The screen 10 may modify the indication in various forms. For example, the screen 10 may switch indicated information among a residual fuel level, a fuel mileage, an interior temperature, an exterior temperature, a clock, and/or the like by modifying the symbols 130*a*, 130*b*, a scale pitch of the tick marks 120*a*, 120*b*, 120*c*, and the indicated item 140.

Referring back to FIG. 1, the screen 10 may have a center hole 18*a* at its center. The pointer 20 may be inserted in the center hole 18*a*. The pointer 20 may be located adjacent to the display surface of the screen 10. The pointer 20 may include a pointer shaft 23, a body 24, and an arm 26. The arm 26 may extend linearly from the body 24. The body 24 and the arm 26 may be located above the display surface of the screen 10. The pointer shaft 23 may extend through the center hole 18*a*.

The lighting device 30 may be equipped on a sub-PCB 32 and may be located behind the screen 10 to form a backlight configuration. The lighting device 30, the sub-PCB 32, and the screen 10 may be integrated into a singular indicator module 4. The sub-PCB 32 may be equipped with a flat cable 34. The indicator module 4 may be mounted on the PCB 70 via a bracket 38. The flat cable 34 may be coupled with a wire harness 36 equipped on the PCB 70 to electrically communicate the indicator module 4 with the PCB 70. The sub-PCB 32 may have printed wirings to conduct electric power from the PCB 70 to drive the lighting device 30 and the screen 10. The printed wirings of the sub-PCB 32 may conduct an electronic signal from the PCB 70 to operate the lighting device 30 and the screen 10.

The lighting device 30 may emit light to the rear side of the screen 10. The lighting device 30 may be a combination of a non-opaque light conductor and a light source such as a light emitting diode (LED) and/or a fluorescent tube. The light source may emit light into the light conductor. The light conductor may diffuse the light and may cause reflection of the light internally thereby to direct the light toward the rear side of the screen 10.

The PCB 70 may be located between the main housing 60 and the rear housing 90. The PCB 70 may be equipped with the lighting device 30 such that the lighting device 30 is opposed to the rear side of the screen 10. The PCB 70 may have a center hole 78 at its center. The PCB 70 may be equipped with electronic wirings and electronic devices such as a controller 100. The controller 100 may be a microcomputer including a CPU, a storage unit such as a RAM and ROM, which are connected with an internal bus. The controller 100 may be configured to execute a computer program to implement various processings thereby to control components and to create data of a graphic.

The driver unit 80 may be equipped to the PCB 70. The driver unit 80 may be stationary relative to both the PCB 70 and the screen 10. The driver unit 80 may be an electric motor such as a stepping motor. The driver unit 80 may include a driver shaft 84, a rotor 86, and a stator 88, which are coaxial with each other. The driver shaft 84 may be supported at both ends and may be affixed to the rotor 86. The stator 88 may be configured to receive electricity from a driving circuit via electric wirings 72 (FIG. 4) printed on the PCB 70. Thus, the stator 88 may generate a magnetic field to drive the driver shaft 84 via the rotor 86. Specifically, the stator 88 may include teeth being equipped with windings, respectively. The driving circuit may energize the windings sequentially to generate a rotational magnetic field. The rotational magnetic field may induce adjacent teeth formed on the rotor 86 thereby to rotate the rotor 86 and the driver shaft 84. The diver unit may include a reduction gear combined with the stepping motor. The driving circuit may be controlled by the controller 100.

The driver shaft 84 may be projected through the center hole 78 of the PCB 70. The driver shaft 84 may be further coupled with the pointer shaft 23 of the pointer 20. The driver unit 80 may be configured to manipulate the pointer 20 at an appropriate rotational position to point the tick marks 120a, 120b, 120c and the symbols 130a, 130b (FIG. 7) indicated on the screen 10.

The main housing 60 may include a housing center 64 defining a tubular hollow 64a. In the example, the image sensing device 50 may be equipped on the PCB 70 and may be located in the tubular hollow 64a of the housing center 64. The rear housing 90 may be equipped to the PCB 70 to accommodate the driver unit 80 and the controller 100.

(Position Detecting Structure)

Figure 2:
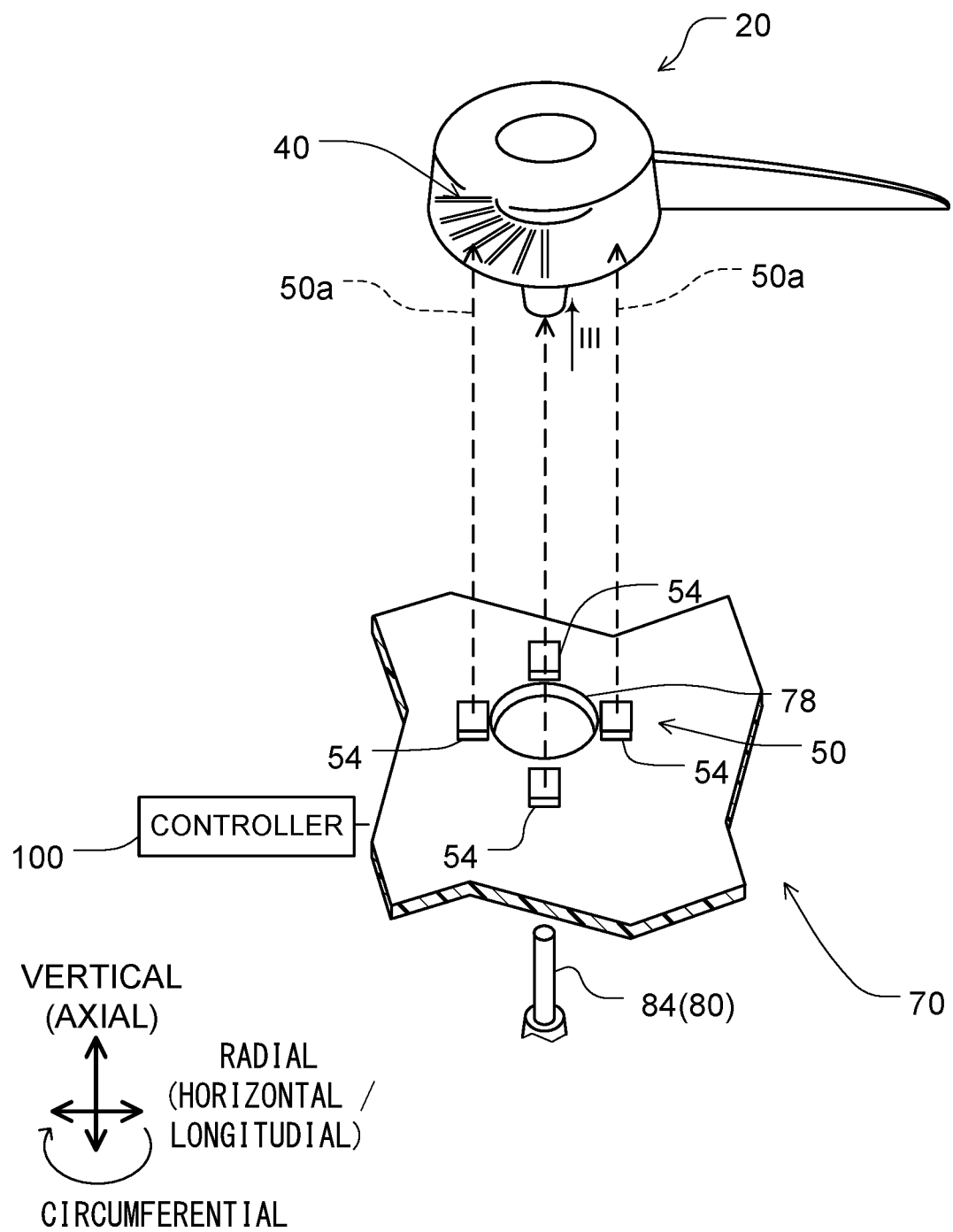
FIG. 2 is a perspective view showing components of the indicating device.

As shown in FIG. 2, according to the present example, the image sensing device 50 may include one or more image sensing element(s) 54. Each image sensing element 54 may be a coupled charge device (CCD) sensor, which may be an array of CCD elements and may be configured to detect a shape and a color of an object.

The pointer shaft 23 of the pointer 20 and the driver shaft 84 of the driver unit 80 may be coupled together to extend through the center hole 78 of the PCB 70. The image sensing elements 54 may be faced to a rear side of the pointer 20. The image sensing elements 54 may be positioned on the PCB 70, such that optical axes 50a thereof are directed toward the rear side of the pointer 20.

Figure 3:
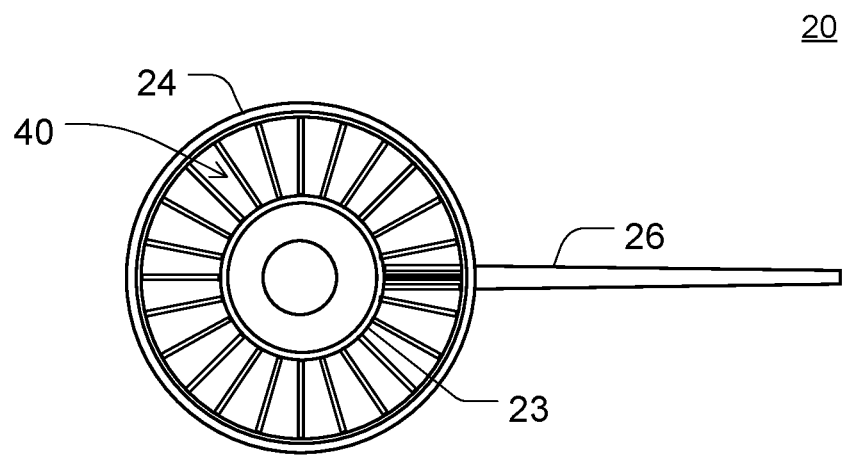
FIG. 3 is a rearview showing a pointer of the indicating device; sectional view showing a pointer of the indicating device.
Figure 3:
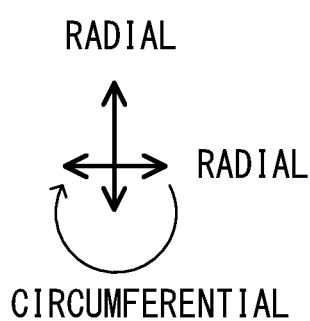

As shown in FIG. 3, the pointer 20 may have slits (marker) 40 on the rear side of the body 24. The slits 40 may be extended from a radially center side to a radially outer side. Each of the slits 40 may be in a rectangular shape or in a sector shape. The slits 40 may be allocated at a regular interval in the circumferential direction. In actual configuration, the slits 40 may be allocated at a fine pitch. One of the slits 40 corresponding to the position of the pointer 20 may be different in shape and/or may be different in color to enable the controller 100 to recognize the position of the pointer 20 as a reference position. A dot-matrix pattern may be used instead of the slits 40.

In FIG. 2, in the present example, the image sensing elements 54 may be opposed to the slits 40 of the pointer 20 and may be enabled to detect an image of the slits 40. As the driver unit 80 rotates the pointer 20, the image sensing element 54 may send an image signal of the slits 40 to the controller 100. Thus, the controller 100 may count the number of the slits 40 passing over the image sensing element 54. In this way, the controller 100 may detect the rotational position of the pointer 20.

(Mechanical Configurable Rotational Position)

The controller 100 may store a correspondence between an output signal, which is sent to the driver unit 80, and the rotational position of the pointer 20. Based on the correspondence, the controller 100 may determine the output signal to rotate the pointer 20. Specifically, the controller 100 may send an output signal, which corresponds to a predetermined rotational position of the pointer 20, to the driver unit 80, thereby to rotate the pointer 20 at the predetermined rotational position. The controller 100 may feedback control the output signal such that the rotational position of the pointer 20, which is detected with the image sensing elements 54, coincides with the predetermined rotational position.

The controller 100 may be further configured to modify the correspondence. For example, the controller 100 originally has an output signal range of the output signal between 0 mA and 10 mA corresponding to a lower scale at 0 degree and an upper scale at 360 degree in the dial gauge 110. That is, the controller 100 originally sends 0 mA to position the pointer 20 at the lower scale at 0 degree and sends 10 mA to position the pointer 20 at the upper scale at 360 degrees. In this exemplified configuration, the controller 100 may modify the correspondence such that the controller 100 sets the output signal at 5 mA to the lower scale. With this exemplified modification, the controller 100 may send 5 mA, which is a half value of the output signal range, to indicate the lower scale. When the controller 100 sends 5 mA, the driver unit 80 rotates the pointer 20 at 180 degrees to indicate the lower scale. In this way, the controller 100 may shift the lower scale from 0 degree to 180 degrees. Thus, in this example, the lower scale is set at 180 degrees, and the upper scale is set act the 360 degrees.

The controller 100 may control the rotational position of the pointer 20 by controlling a number of energization of stepper coils of the driver unit 80. The controller 100 may store a correspondence between the number of energization and the rotational position of the pointer 20, instead of the above-exemplified electric signal of 0 to 10 mA.

Similarly, the controller 100 may modify the correspondence for the upper scale. In this way, the controller 100 may arbitrarily modify the rotational positions of the pointer 20 at the lower scale and the upper scale, respectively.

The controller 100 may store a correspondence between a minimum output signal and the lower scale of the rotational range, a correspondence between a maximum output signal and the upper scale of the rotational range, and a correspondence between an intermediate output signal and an intermediate scale, which is between the lower scale and the upper scale. The intermediate scale may include multiple intermediate scales, which are allocated by uniformly dividing the rotational range between the upper scale and the lower scale. The multiple intermediate scales may be associated with multiple intermediate output signals.

The controller 100 may modify those correspondences to modify the rotational range of the pointer 20. Specifically, the controller 100 may increase the minimum output signal or may reduce the maximum output signal thereby to reduce the rotational range. Contrary, the controller 100 may reduce the minimum output signal or may increase the maximum output signal thereby to increase the rotational range. In these cases, the controller 100 may reduce or increase the intermediate signals uniformly such that the intermediate signals are dispersed uniformly between the minimum output signal and the maximum output signal. That is, the controller 100 may arbitrarily modify, i.e., shift, expand, and shrink the rotational range of the pointer 20.

Figure 4:
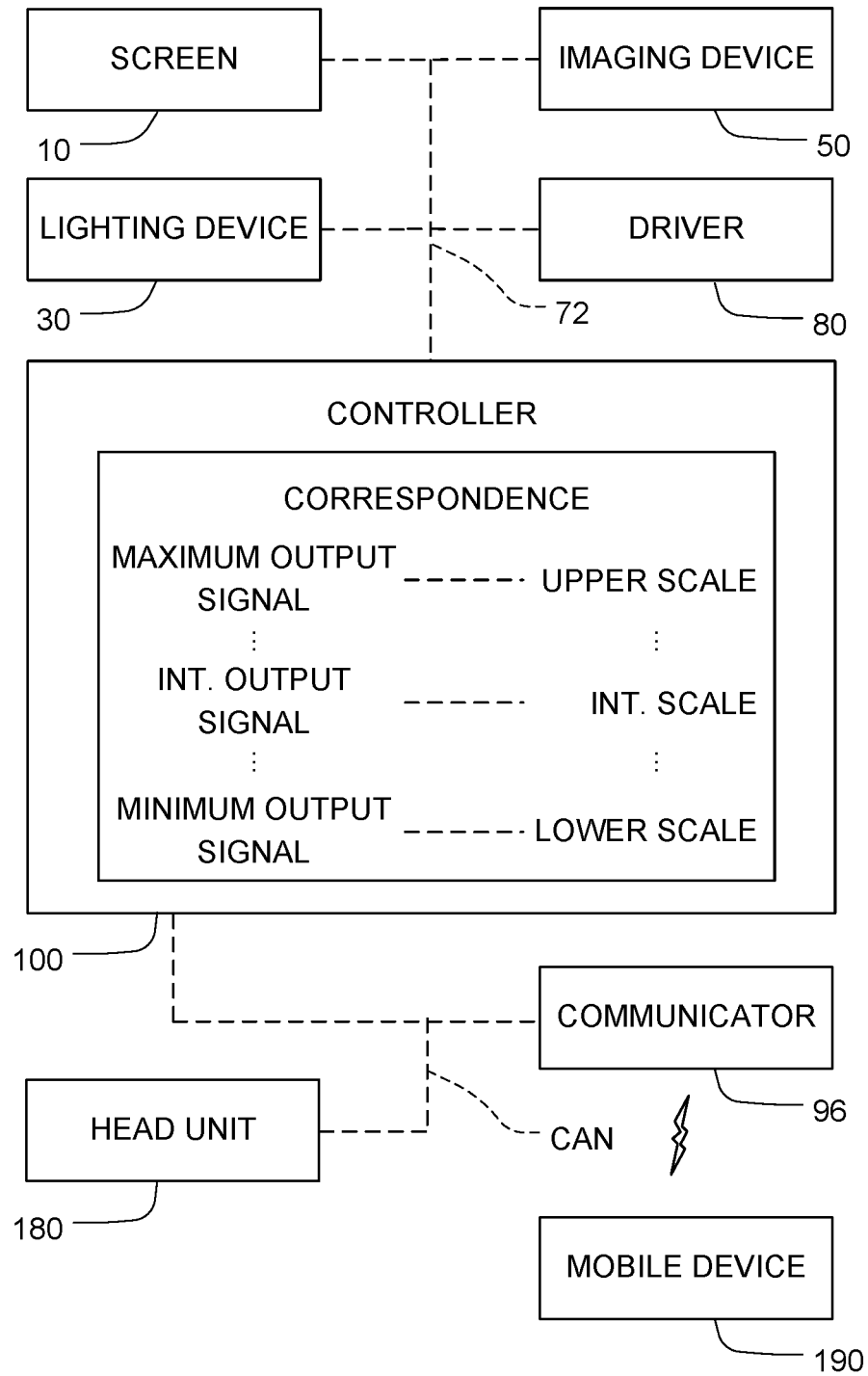
FIG. 4 is a block diagram showing electrical connection for the indicating device.

As shown in FIG. 4, in the example, the controller 100 may be electrically connected with the screen 10, the image sensing device 50, the lighting device 30, and the driver unit 80 via for example, a signal bus. The signal bus may be formed of the electric wiring 72 printed on the PCB 70. The image sensing device 50 may send the detection signal (image signal) to the controller 100 thereby to enable the controller 100 to recognize the rotational position of the pointer 20. The controller 100 may create a graphic image data of the dial gauge 110 (FIG. 7) and may send the graphic image data to the screen 10 to cause the screen 10 to indicate the dial gauge 110. The controller 100 may control energization of the lighting device 30 thereby to manipulate intensity of light emitted from the lighting device 30 to the screen 10.

The controller 100 may be further connected with a head unit 180 and a communicator 96 via a network system such as a control area network (CAN). The head unit 180 may be equipped on a center console of the vehicle. The communicator 96 may be a wireless communication device to conduct wireless communications with a mobile device 190. The mobile device 190 may be a smart phone or a tablet device.

(Main Menu Screen)

Figure 5:
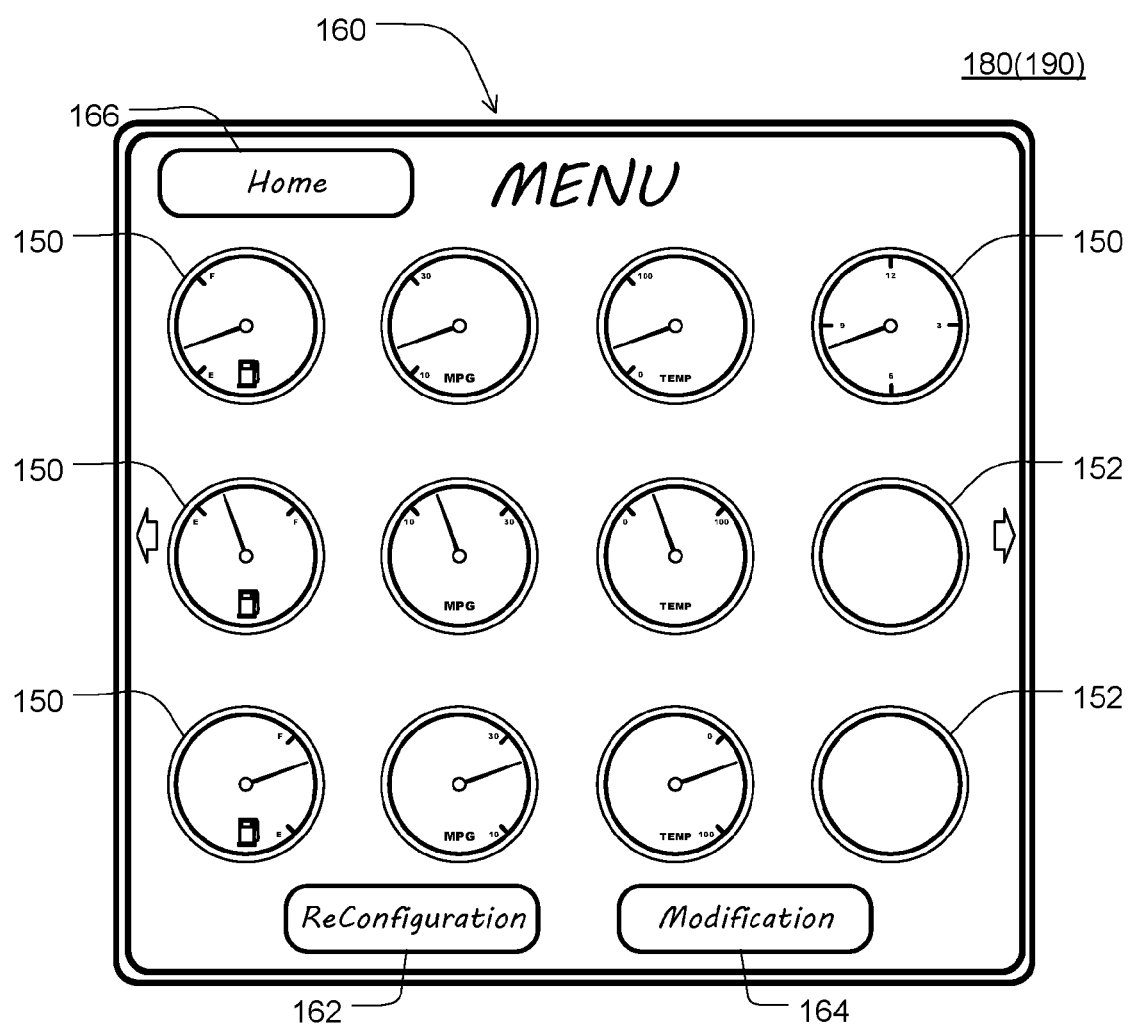
FIG. 5 is a view showing a main menu screen for selecting a graphic symbol.

FIG. 5 shows a main menu screen 160. The main menu screen 160 may be indicated on the head unit 180 and/or the mobile device 190. The main menu screen 160 may be operated by, for example, a touch operation of an occupant, and/or moving a cursor by using a manipulating device such as a joystick.

The main menu screen 160 includes multiple graphic symbols 150 each indicating a dial gauge. Each dial gauge has its own rotational range and its own indicated item, such as a graphic image of a gas pump. An occupant may select one of the graphic symbols 150 by manipulating one of the graphic symbols 150. This manipulation may be made by, for example, touching the graphic symbol 150 or clicking a mechanical button. On manipulation, indication of the manipulated graphic symbol 150 may be modified by, for example, inverting or blinking.

The main menu screen 160 further includes a reconfiguration button 162, a modification button 164, and a home button 166. After selecting the one graphic symbol 150, an occupant may manipulate the reconfiguration button 162 to initiate a reconfiguration process. Alternatively, after selecting the one graphic symbol 150, an occupant may manipulate the modification button 164 to initiate a modification process. An occupant may manipulate the home button 166 to return to a home screen (not shown) at a higher hierarchy.

The main menu screen 160 may be switched to another main menu screen by manipulating an arrow button, by manipulating a steering switch, by uttering a voice command, by flicking the screen, by showing a gesture, such as and/or the like. The main menu screen 160 may include blank symbols 152. An occupant may modify the blank graphic symbol 152 to create a new configuration of a gauge and may assign the created gauge in the main menu screen 160.

(Reconfiguration Process)

As follows, the reconfiguration process will be described with reference to FIG. 6. The controller 100 may execute a program to implement the reconfiguration process shown in FIG. 6 at a predetermined interval such as 1 second.

At S101, the controller 100 may determine whether an occupant selects one of the graphic symbols 150 on the main menu screen 160 in FIG. 5. When S101 makes a positive determination, at S102, the controller 100 may determine whether an occupant manipulates the reconfiguration button 162 in FIG. 5.

FIG. 7 shows the indicating device 1 in an original state. In the present example, the minimum tick mark 120*a* and the minimum symbol 130*a* are indicated at the lower scale substantially at about 225 degrees. The maximum tick mark 120*b* and the maximum symbol 130*b* are indicated at the upper scale substantially at 315 degrees. The upper scale and the lower scale define the rotational range R therebetween.

Figure 6:
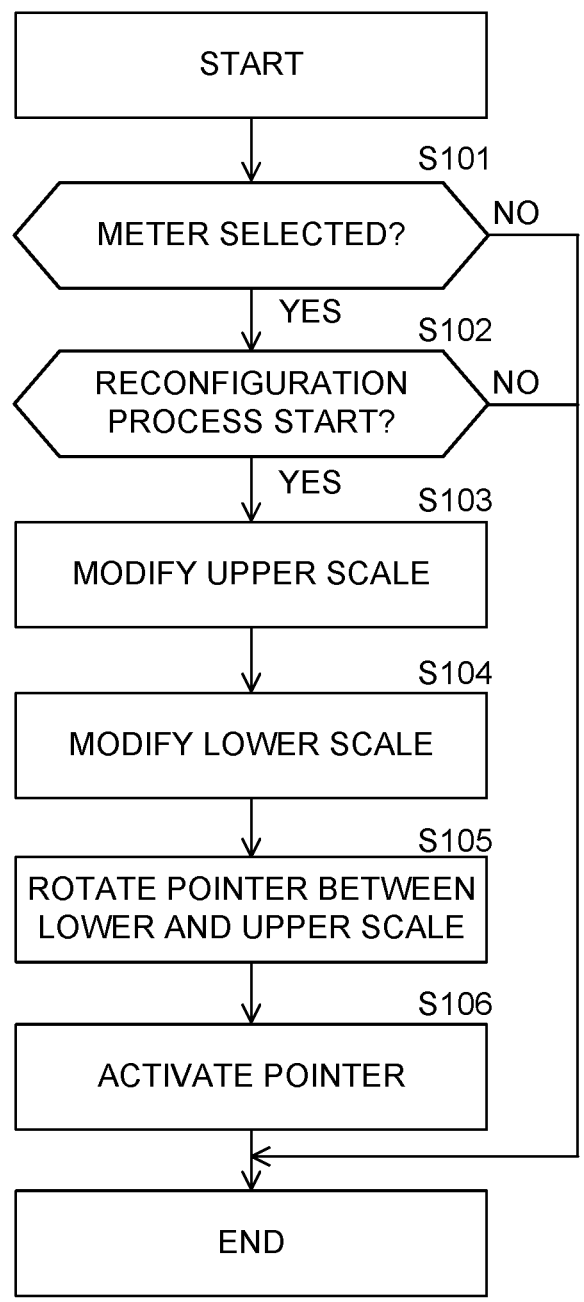
FIG. 6 is a flowchart showing a reconfiguration process of the indicating device.
Figure 8:
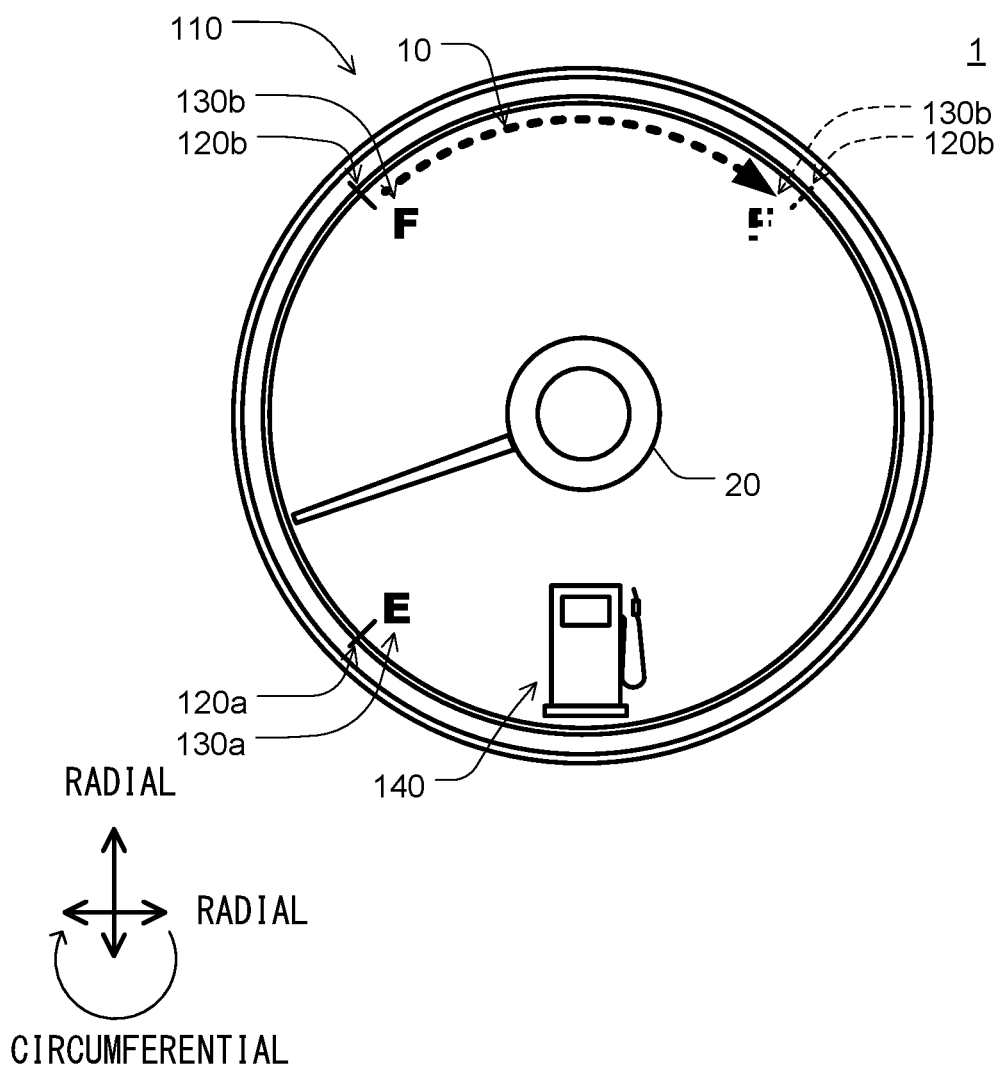
FIG. 8 is a front view showing the indicating device moving an upper scale in the reconfiguration process.

When S102 in FIG. 6 makes a positive determination, at S103, the controller 100 may cause the screen 10 to move indication of the maximum tick mark 120*b* and the maximum symbol 130*b* in the dial gauge 110. Specifically, for example, as shown in FIG. 8, the screen 10 may indicate an animation to move the maximum tick mark 120*b* and the maximum symbol 130*b* smoothly along the clockwise direction to a predetermined position corresponding to a new position of the upper scale in the selected graphic symbol 150. Simultaneously, the controller 100 may cause an animation to expand the intermediate tick marks 120*c* (not illustrated) to be dispersed uniformly between the minimum tick mark 120*a* and the maximum tick mark 120*b* in the rotational direction.

Figure 9:
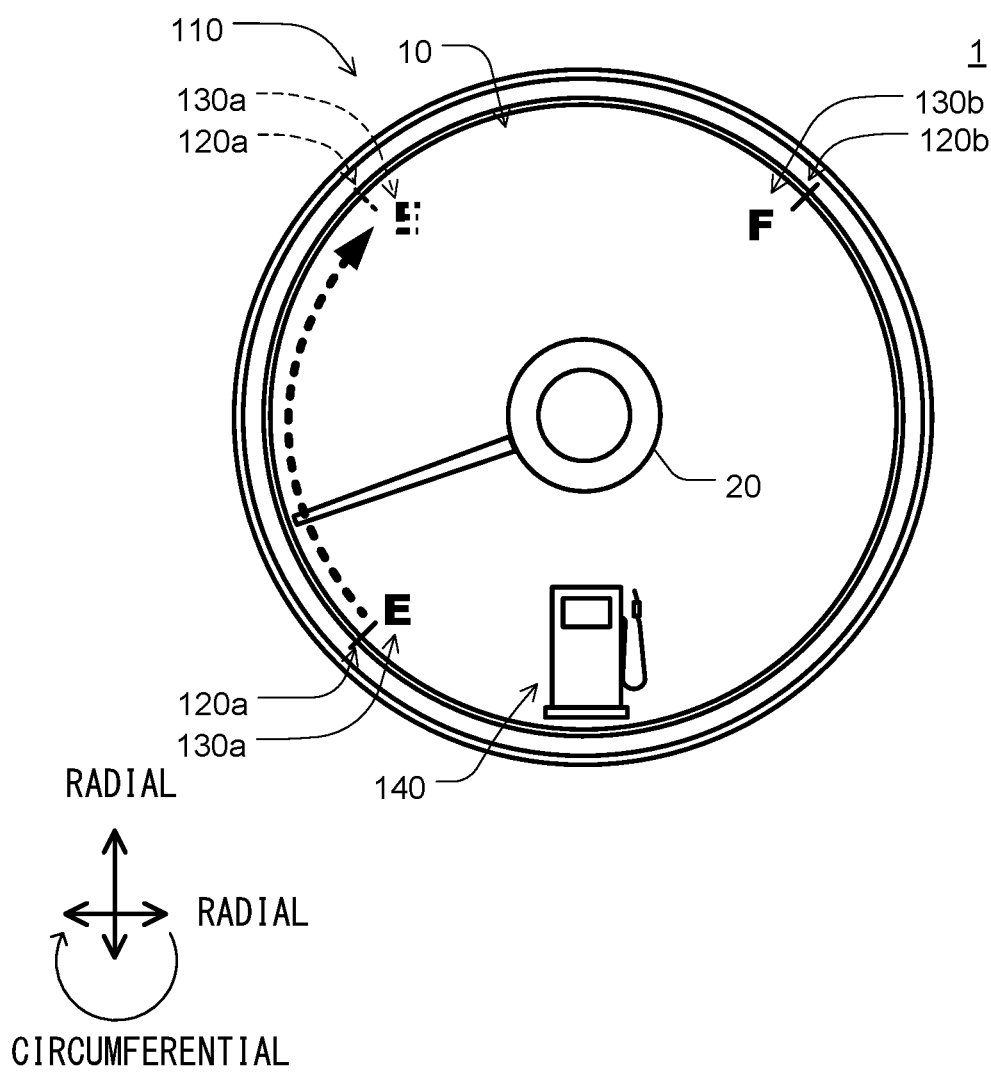
FIG. 9 is a front view showing the indicating device moving a lower scale the in reconfiguration process.

Subsequently, at S104, the controller 100 may cause the screen 10 to move indication of the minimum tick mark 120*a* and the minimum symbol 130*a* in the dial gauge 110. Specifically, for example, as shown in FIG. 9, the screen 10 may indicate an animation to move the minimum tick mark 120*a* and the minimum symbol 130*a* smoothly along the clockwise direction to a new position of the lower scale in the selected graphic symbol 150. Simultaneously, the controller 100 may cause an animation to shrink the intermediate tick marks 120*c* (not illustrated) to be dispersed uniformly between the minimum tick mark 120*a* and the maximum tick mark 120*b* in the rotational direction.

Figure 10:
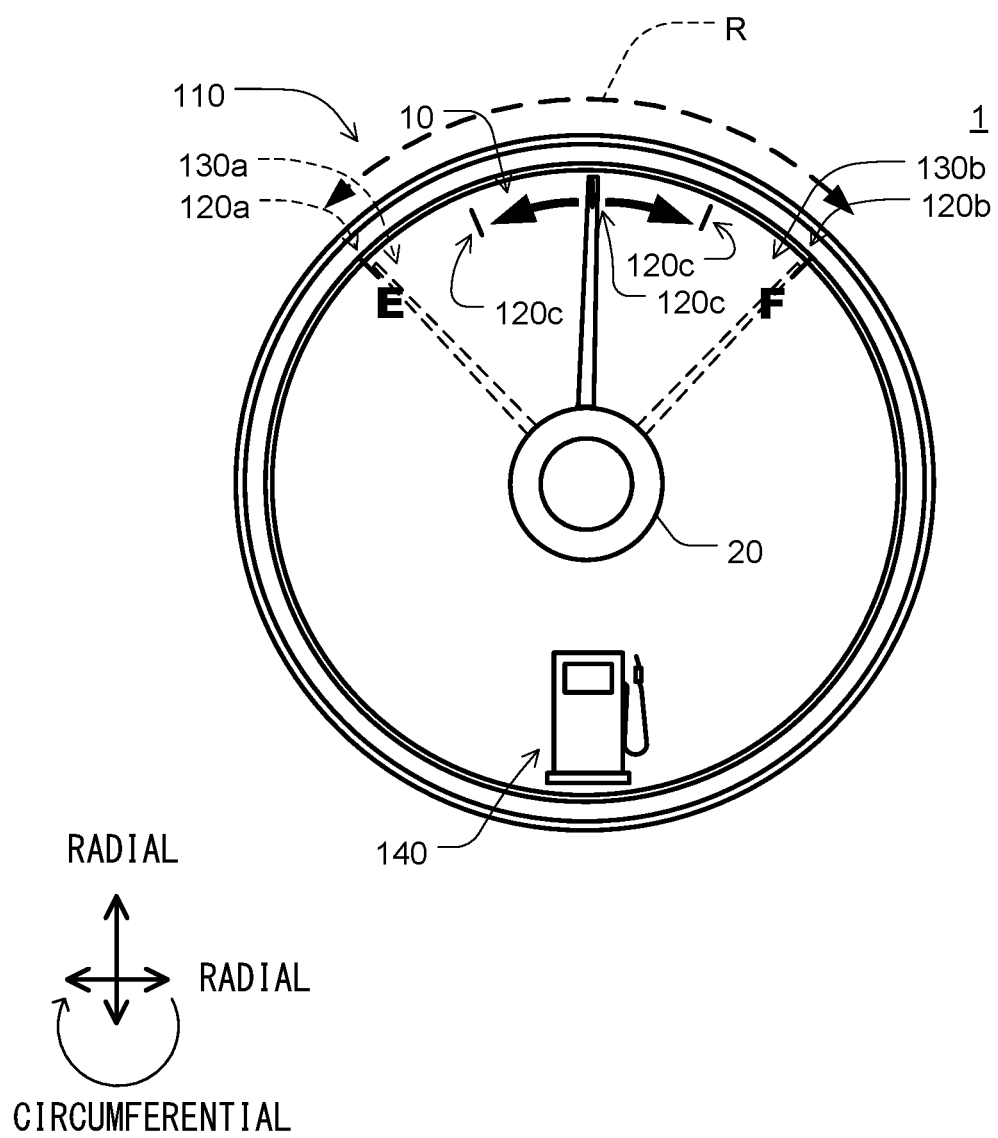
FIG. 10 is a front view showing the indicating device moving the pointer in the reconfiguration process.

Subsequently, at S105, the controller 100 may notify an occupant of the reconfigured rotational range. Specifically, as shown in FIG. 10, the controller 100 may cause the driver unit 80 to rotate the pointer 20 between the modified minimum tick mark 120*a* and the modified maximum tick mark 120*b*.

Subsequently, at S106, the controller 100 may cause the driver unit 80 to position the pointer at a position to indicate a present residual fuel level relative to the modified upper and lower scales. Thus, the controller 100 terminates the reconfiguration process.

(Sub-Menu)

Figure 11:
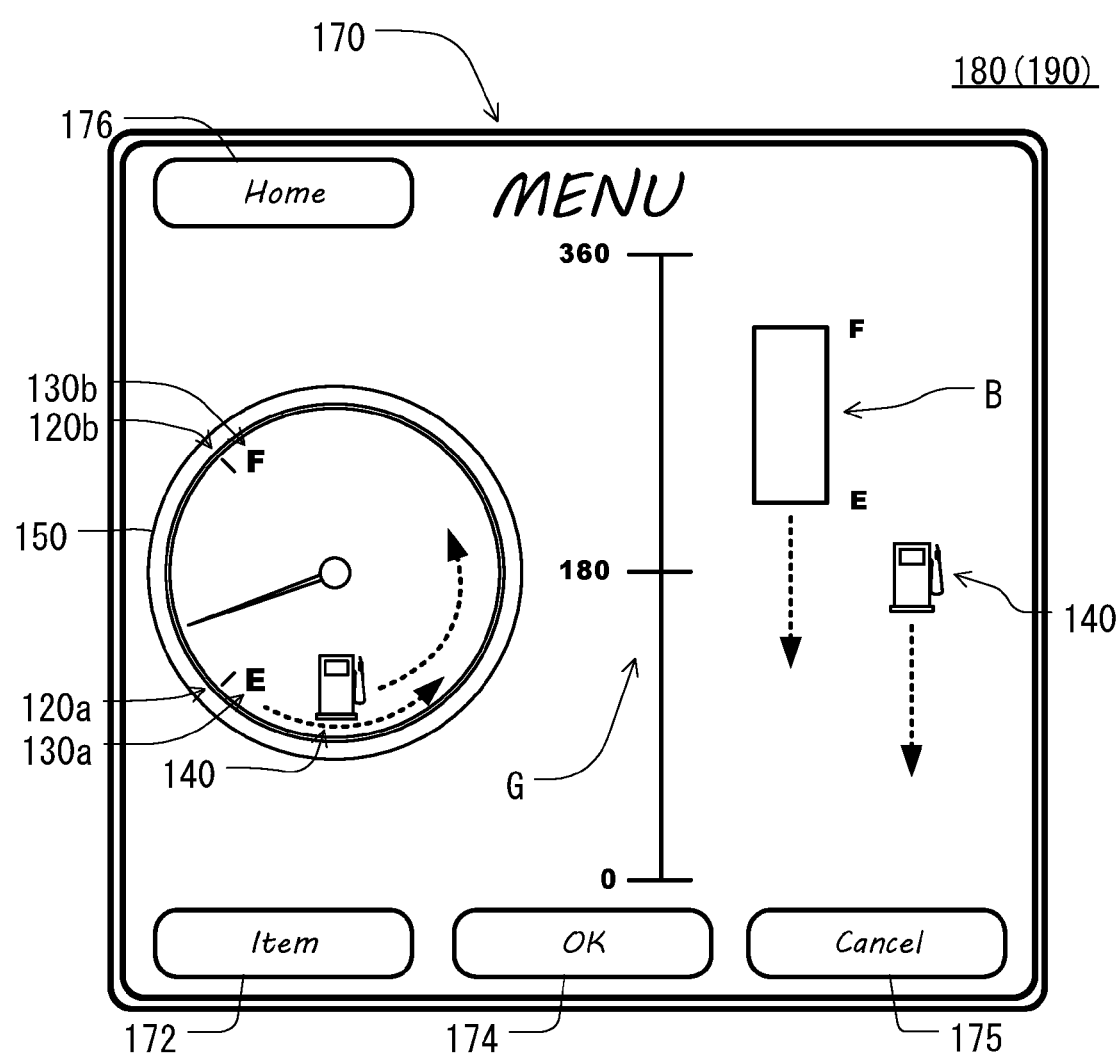
FIG. 11 is a view showing a sub-menu screen for a modification process.

FIG. 11 shows a sub-menu screen 170. The sub-menu screen 170 may be indicated on the head unit 180 and/or the mobile device 190, similarly to the main menu screen 160. The sub-menu screen 170 may include a selected graphic symbol 150, a gauge G, a bar indicator B, and the indicated item 140. The gauge G shows to a full rotational range of the pointer 20 in the dial gauge 110. In this example, the gauge G has an angular scale from 0 degree to 360 degrees. The bar indicator B corresponds to the rotational range of the pointer 20 in the selected graphic symbol 150. The indicated item 140 adjacent to the bar indicator B is located at a vertical position, which corresponds to a circumferential position of the indicated item 140 in the selected graphic symbol 150.

An occupant may manipulate an upper scale and a lower scale of the bar indicator B. For example, an occupant may drag an end of the bar indicator B to expand or to shrink the bar indicator B. In response to manipulation of the end of the bar indicator B, the minimum tick mark 120a and the minimum symbol 130a at the lower scale or the maximum tick mark 120b and the maximum symbol 130b at the upper scale may be moved accordingly in the rotational direction in the graphic symbol 150. In addition, an occupant may manipulate the indicated item 140. In response to manipulation of the indicated item 140, the indicated item 140 may be moved accordingly in the rotational direction in the graphic symbol 150.

The sub-menu screen 170 may further include a home button 176, an item button 172, an OK button 174, and a cancel button 175. An occupant may manipulate the item button 172 to change the indicated item 140 of the graphic symbol 150. Specifically, the indicated item 140 may be switched from a gas pump, which corresponds to a fuel gauge, to a MPG symbol, which corresponds to a mileage meter, a TEMP symbol, which corresponds to a temperature meter, and/or the like, sequentially.

Figure 12:
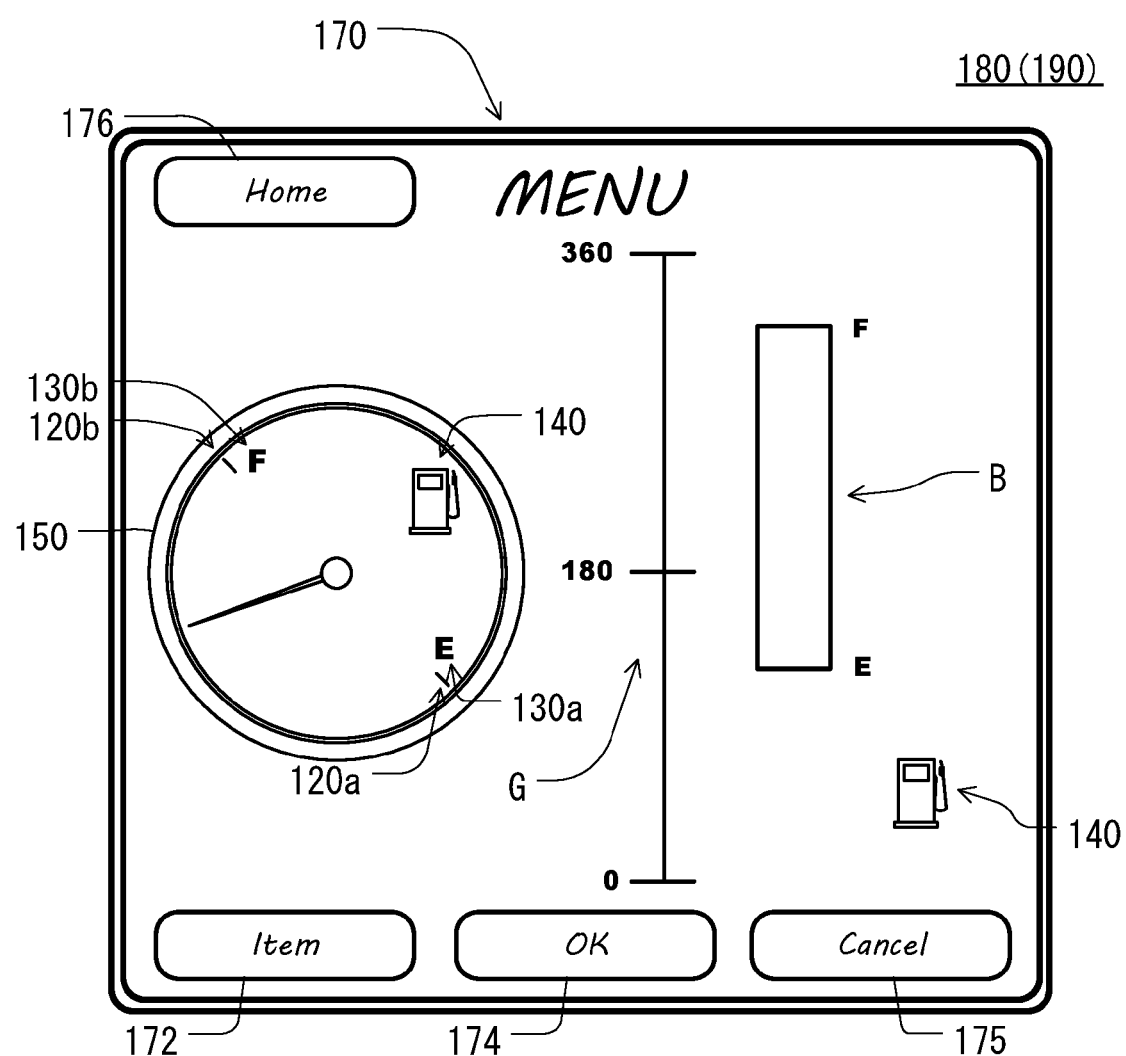
FIG. 12 is a view showing the sub-menu screen after setting a configuration.

In this example, it is assumed that the lower end of the bar indicator B is elongated downward, and the indicated item 140 is moved downward, along with the dotted arrows. FIG. 12 shows the sub-menu screen 170 after an occupant modifies the configuration. In this example, the lower scale is modified from 225 degrees to 135 degrees. Thus, the indicator bar B is elongated downward, and the rotational range is also enlarged to about 180 degrees in the graphic symbol 150. In addition, the position of the indicated item 140 is modified in the graphic symbol 150 correspondingly to movement of the indicated item 140 downward on the right side in the sub-menu screen 170.

After modifying the upper scale and/or the lower scale, an occupant may manipulate the OK button 174 to set the modified upper scale, the lower scale, and/or the position of the indicated item 140. An occupant may manipulate the cancel button 175 to quit the sub-menu screen 170 thereby to return to the main menu screen 160.

(Modification Process)

Figure 13:
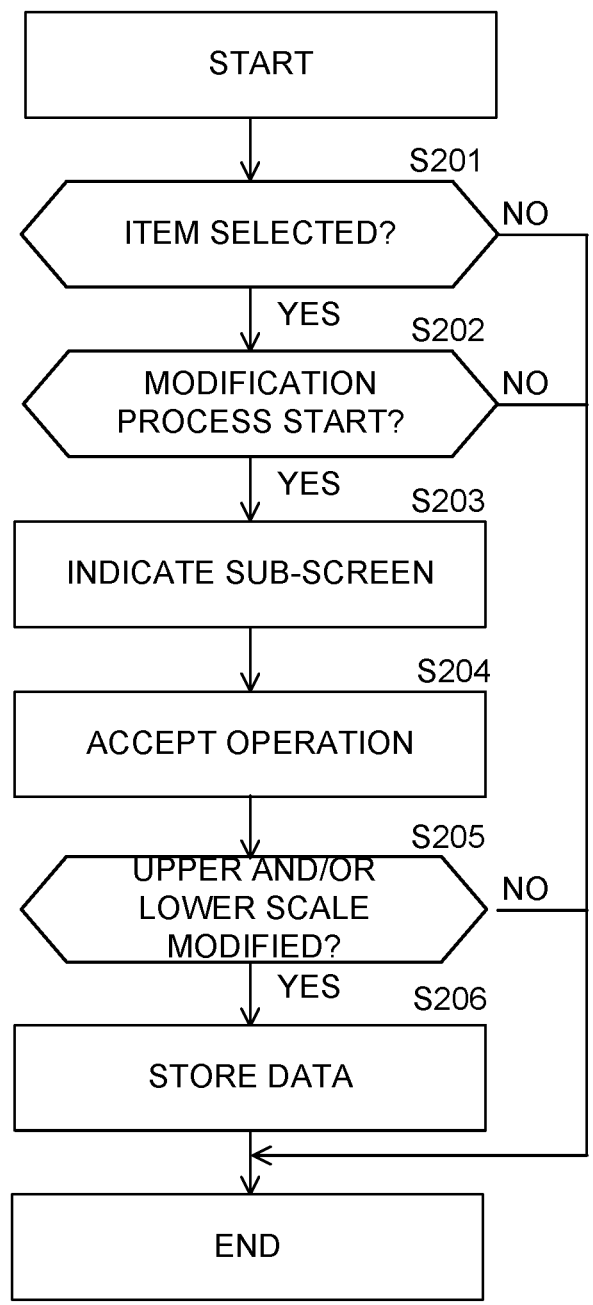
FIG. 13 is a flowchart showing the modification process.

As follows, the modification process will be described with reference to FIG. 13. At S201, the controller 100 may determine whether an occupant selects one of the graphic symbols 150 in the main menu screen 160 in FIG. 5. When S201 makes a positive determination, at S202, the controller 100 may determine whether an occupant manipulates the modification button 164 in the main menu screen 160 in FIG. 5.

When S202 makes a positive determination, at S203, the controller 100 may indicate the sub-screen menu 170 shown in FIG. 12. At S204, the controller 100 may accept operation of an occupant, i.e., dragging an end of the bar indicator B and/or dragging the indicated item 140. When an occupant manipulates the OK button 174, the processing proceeds to S205. At S205, the controller 100 determines whether the upper scale, the lower scale, and/or the position of the indicated item 140 is modified. When S205 makes a positive determination, at S206, the controller 100 stores data of the modified upper scale, the modified lower scale, and/or the modified position of the indicated item 140. Thus, the controller 100 terminates the modification process. The modified item is registered in the main menu screen 160 and can be rendered selectable by an occupant.

Figure 14:
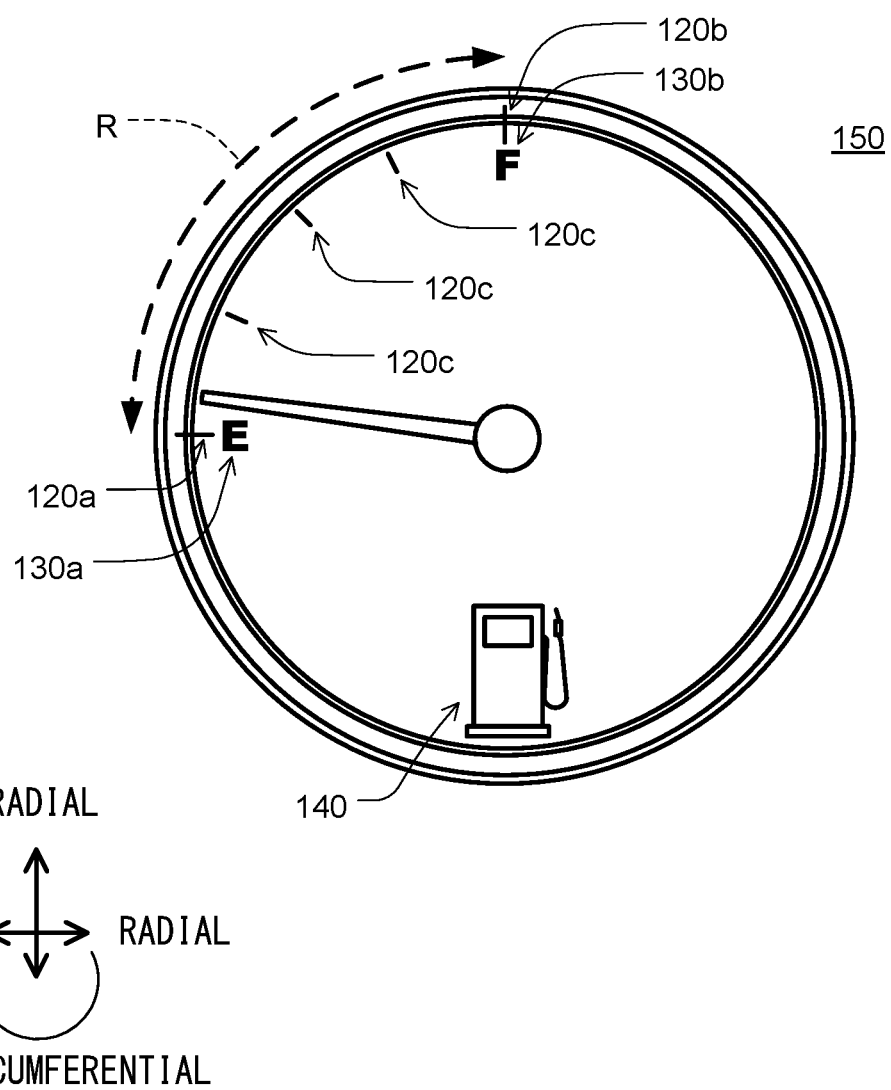
FIG. 14 is a front view showing the indicating device before the modification process.

In FIG. 14, the graphic symbol 150 is in an original state before implementing the modification process. In the present example, the lower scale is at about 270 degrees, and the upper scale is at 360 degrees.

Figure 15:
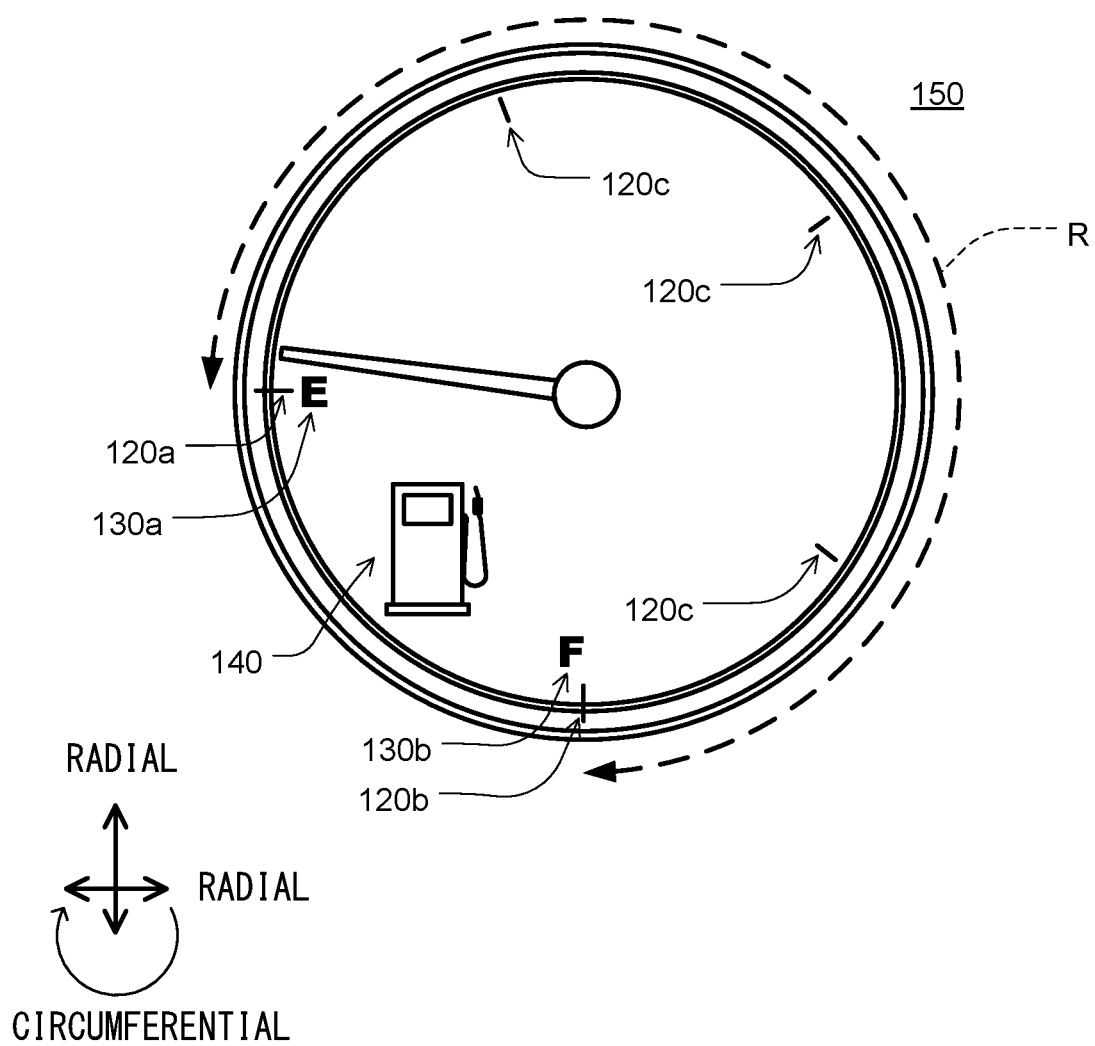
FIG. 15 is a front view showing the indicating device after the modification process.

In FIG. 15, the graphic symbol 150 is in a state after the modification process. In the present example, the lower scale is at the same position as in the original state, and the upper scale is modified by 180 degrees. Consequently, the controller 100 expands a graphic image, which includes the intermediate tick marks 120c, the minimum tick mark 120a, and the maximum tick mark 120b, in the rotational direction according to the rotational range R, which is enlarged.

The position of the indicated item 140 may be moved to a position outside the rotation range, not to overlap with the maximum tick mark 120b and the maximum symbol 130b at the upper scale.

The modified graphic symbol 150 may be registered to be selectable in the main menu screen 160 and may be reflected on the indication device 1 by implementing the reconfiguration process.

Second Embodiment

Figure 16:
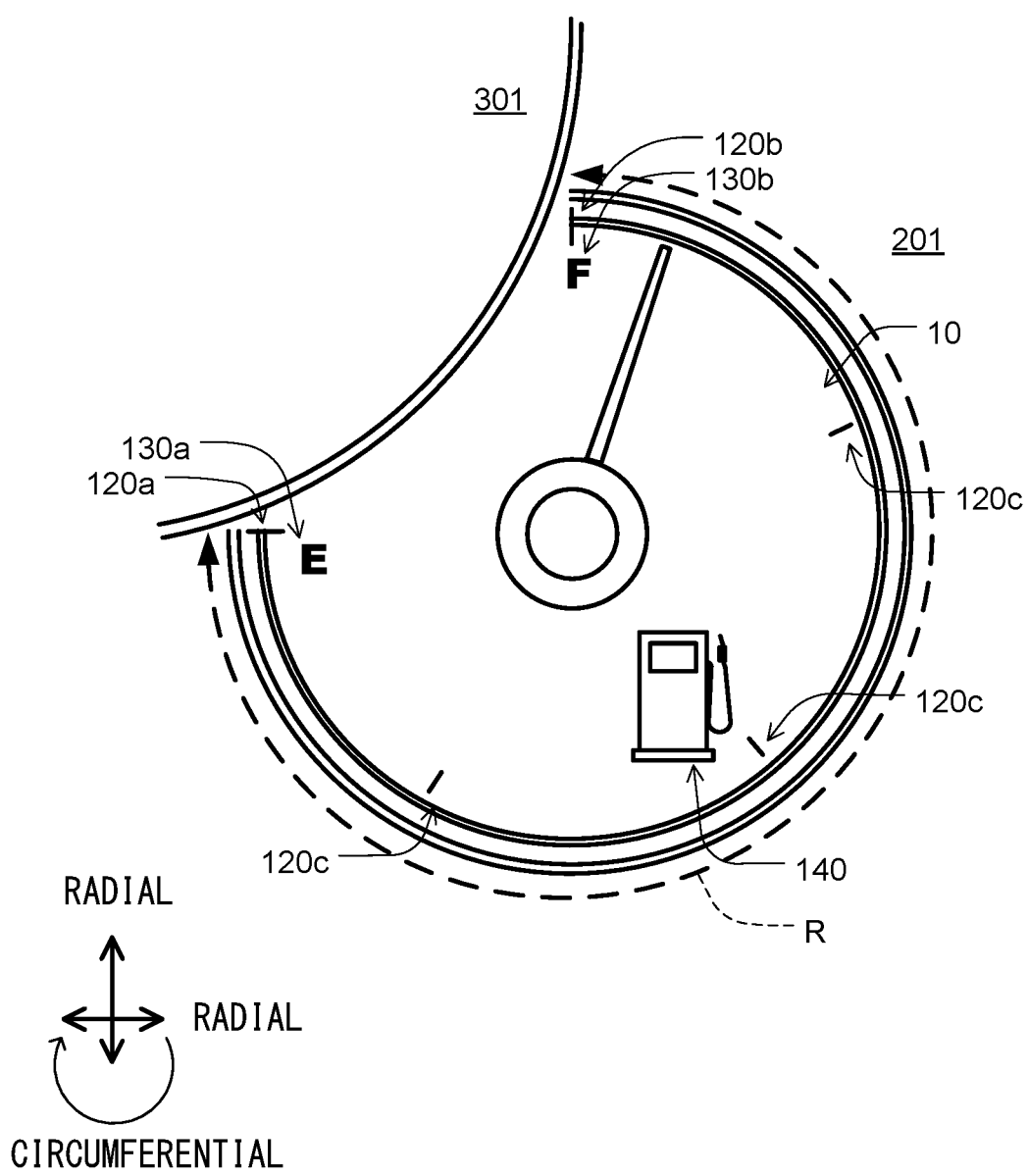
FIG. 16 is a front view showing an indicating device according to a second embodiment.

As shown in FIG. 16, an indicating device 201 according to the present embodiment is one device of a combination meter. The indicating device 201 partially overlaps with another meter device 301, and therefore, the indicating device 201 is partially hollowed out. Specifically, in the example, the rotational range of the indicating device 201 can be selectable within the physically selectable rotational range of 270 degrees from 0 degree to 270 degree at maximum. In this case, in the modification process, the rotation range may be restricted within the physically selectable rotational range. Specifically, in the sub-menu screen 170 shown in FIG. 11, the controller 100 may prohibit an occupant from setting the upper scale and the lower scale outside the selectable rotational range. For example, the controller 100 may restrict expansion of the indication bar and/or location of the indicated item 120 outside the selectable rotational range.

Other Embodiments

Figure 17:
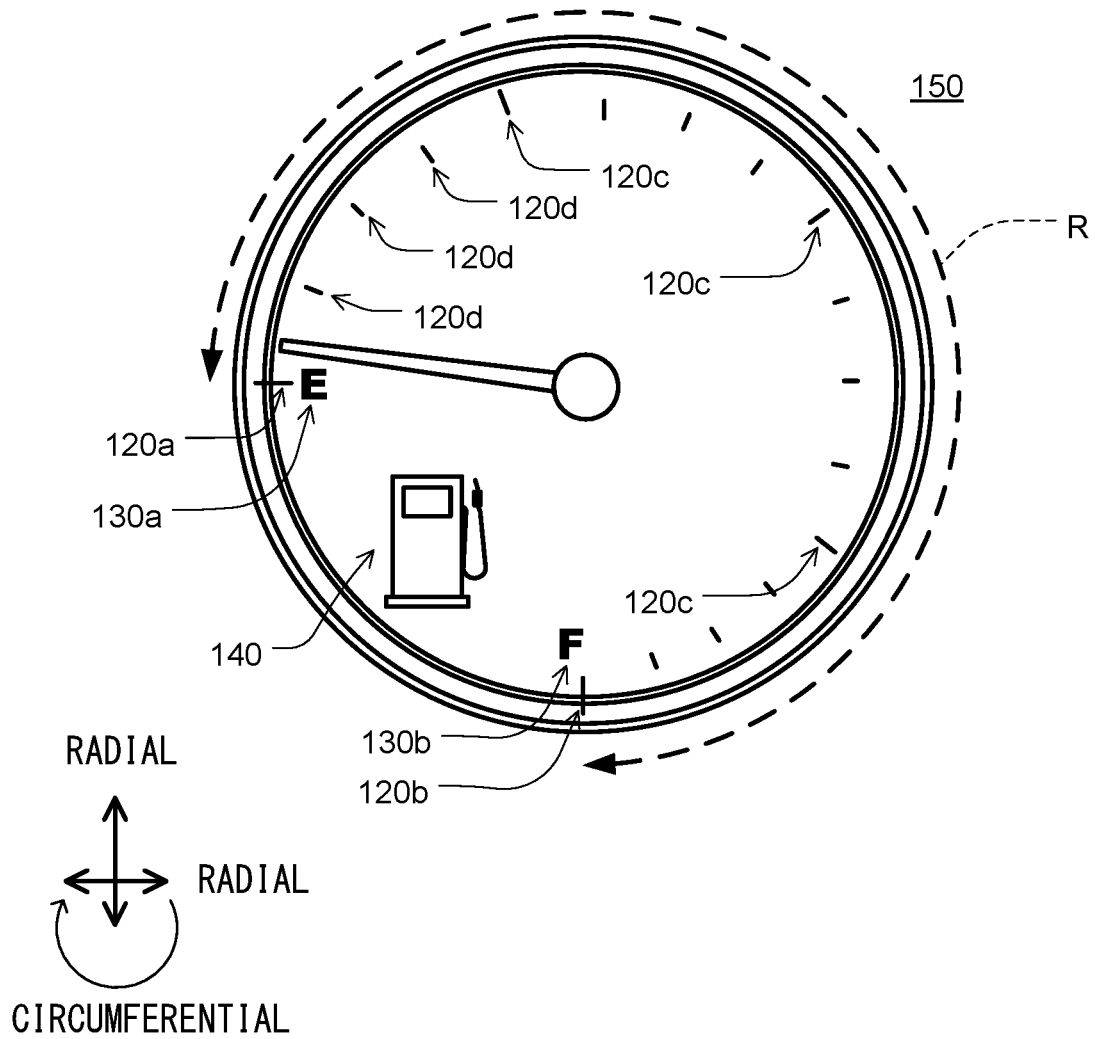
FIG. 17 is a front view showing an indicating device according to another embodiment.

As described above, in the example of FIG. 15, the controller 100 may expand the graphic image, which includes the intermediate tick marks 120c, the minimum tick mark 120a, and the maximum tick mark 120b, in the rotational direction according to the rotational range R, which is enlarged. As shown in FIG. 17, the controller 100 may increase a number of intermediate tick marks 120c between the minimum tick mark 120a and the maximum tick mark 120b, by interpolating additional tick marks 120d.

Contrary, the controller 100 may reduce the number of the intermediate tick marks 120c when shrinking the graphic group in the rotational direction according to the rotational range R, which is reduced, by erasing the additional tick marks 120d. The additional tick marks 120d may be located uniformly between the minimum tick mark 120a and the maximum tick mark 120b. The additional tick marks 120d may be smaller than each of the minimum tick mark 120a and the maximum tick mark 120b to function as sub-scale.

The meter device 1 may be used in various control panels or instrument panels, other than the above-described examples. For example, assumable application may be a fuel gauge, a fuel mileage gauge, an interior temperature gauge (in-cabin of the vehicle), exterior temperature gauge (outside of the vehicle), a clock, an engine temperature gauge, a battery voltage indicator, a hybrid battery regeneration indicator, a speedometer, a tachometer, and/or the like.

In the embodiment, the controller 100 is exemplified as one controller device. The controller is not limited to one controller device. The controller may be aggregation of multiple controller devices. For example, one controller device may be used for graphic processing, and another controller device may be used for manipulating the driver unit. The controller may employ various combinations of electronic and electric devices such as multiple processors, a multicore processor, a logic controller, and/or the like. Those electronic and electric devices may be in data-communication with each other via digital signal.

The reconfiguration process and/or the modification process may be partially executed on the mobile device 190 and/or the head unit 180. For example, the mobile device 190 and/or the head unit 180 may execute S101, S102, S201, and/or S202 and may send information about the selected graphic symbol 150 to the controller 100.

The controller 100 may not use the animation to move the upper scale and the lower scale. Specifically, on initiation of the reconfiguration process, the controller 100 may simply create a graphic image of the dial gauge 110, which already has indication of the modified upper scale and the modified lower scale, and may indicate the created graphic image without the animation.

The movement of the pointer after reconfiguration may be omitted.

The configuration to detect the rotary position of the pointer may be omitted.

Indication of the tick marks or the symbols may be omitted.

The lighting device 30 may be located at an edge of the screen 10 to form an edge-light configuration. The screen 10 may be an organic EL display having a self-luminous configuration without an additional lighting device 30.

The embodiments may be combined with each other and/or replaced with each other. The marker in the second embodiment may be applied to the first embodiment. The multiple image sensing elements may be applied to the third embodiment.

It should be appreciated that while the processes of the embodiments of the present disclosure have been described herein as including a specific sequence of steps, further alternative embodiments including various other sequences of these steps and/or additional steps not disclosed herein may be intended to be within the steps of the present disclosure.

While the present disclosure may have been described with reference to preferred embodiments thereof, it may be to be understood that the disclosure may be not limited to the preferred embodiments and constructions. The present disclosure may be intended to cover various modification and equivalent arrangements. In addition, while the various combinations and configurations, which may be preferred, other combinations and configurations, including more, less or only a single element, may be also within the spirit and scope of the present disclosure.

What is claimed is:

1. An indicating device comprising:
   a screen configured to indicate a graphic;
   a pointer rotational relative to the screen;
   a driver unit equipped with the pointer and configured to rotate the pointer; and
   a controller configured to send an output signal to the driver unit to rotate the pointer in order to indicate a certain value at a rotational position in a rotational range, wherein
   the controller is configured to change the rotational range based on a user's selection, so that the pointer indicates at the different rotational position in the different rotational range even if the pointer is controlled to indicate a same value,
   the graphic includes a maximum tick mark and a minimum tick mark of the value, and
   the controller is configured to change a visible position of at least the maximum tick mark or the minimum tick mark on the screen according to the rotational range, which is changed so that the visible distance between a maximum tick mark and a minimum tick mark on the screen is changed.

2. The indicating device according to claim 1, wherein
   the graphic includes a dial gauge, and
   the dial gauge includes at least a plurality of symbols.

3. The indicating device according to claim 2, wherein
   the controller is configured to store a correspondence between the output signal and the rotational position of the pointer, and
   the controller is configured to modify the correspondence to modify the rotational range.

4. The indicating device according to claim 3, wherein
   the controller is configured to modify an intermediate output signal, which corresponds to an intermediate scale between the lower scale and the upper scale.

5. The indicating device according to claim 4, wherein
   the controller is configured to modify a position of the minimum tick mark according to the minimum output signal, and
   the controller is configured to modify a position of the maximum tick mark according to the maximum output signal.

6. The indicating device according to claim 5, wherein
   the dial gauge includes the plurality of symbols including a minimum symbol and a maximum symbol,
   the controller is configured to modify a position of the minimum symbol according to the minimum output signal, and
   the controller is configured to modify a position of the maximum symbol according to the maximum output signal.

7. The indicating device according to claim 5, wherein
   the controller is configured to increase a number of intermediate tick marks between the minimum tick mark and the maximum tick mark when expanding a graphic image, which includes the intermediate tick marks, the minimum tick mark, and the maximum tick mark, in a rotational direction according to the rotational range, which is enlarged, and the controller is configured to reduce the number of the intermediate tick marks when shrinking the graphic group in the rotational direction according to the rotational range, which is reduced.

8. The indicating device according to claim 1, wherein the graphic includes an indicated item, and
the controller is configured to move the indicated item not to overlap with the at least one of the tick marks and the symbols.

9. The indicating device according to claim 1, wherein
the controller is configured to reduce or increase the rotational range of the pointer, and
the controller is configured to shrink or expand a graphic image, which includes the at least one of the tick marks and the symbols, in a rotational direction according to the rotational range, which is reduced or enlarged.

10. The indicating device according to claim 1, wherein
the controller is configured to receive at least one of a minimum rotational position of the pointer, a maximum rotational position of the pointer, and a position of an indicated item, which is restricted in position not to interfere with another device adjacent to the screen.

11. The indicating device according to claim 1, further comprising:
an image sensing device configured to detect an image of the pointer and to send a signal of the image, wherein
the controller is configured to receive the signal of the image from the image sensing device to detect a rotational position of the pointer.

12. The indicating device according to claim 1, wherein the screen is a dot matrix display.

13. The indicating device according to claim 1, wherein the driver unit is a stepping motor.

* * * * *